United States Patent [19]

Rogers

[11] Patent Number: 5,581,462
[45] Date of Patent: Dec. 3, 1996

[54] VEHICLE COMPUTER SYSTEM AND METHOD

[75] Inventor: Roland T. Rogers, Gaithersburg, Md.

[73] Assignee: Fairchild Space and Defense Corporation, Germantown, Md.

[21] Appl. No.: 178,001

[22] Filed: Jan. 6, 1994

[51] Int. Cl.[6] .................................................. G06F 17/40
[52] U.S. Cl. ........................ 364/424.012; 364/424.04
[58] Field of Search ........................ 364/443, 424.01, 364/424.03, 424.04, 550, 551.01; 340/438, 439

[56] References Cited

U.S. PATENT DOCUMENTS

| | | | |
|---|---|---|---|
| 4,642,775 | 2/1987 | Cline et al. | 364/443 |
| 4,757,454 | 7/1988 | Hisatake et al. | 364/424.03 |
| 4,827,419 | 5/1989 | Selby, III | 364/443 |
| 4,853,859 | 8/1989 | Morita et al. | 364/424.03 |
| 5,278,759 | 1/1994 | Berra et al. | 364/424.04 |

*Primary Examiner*—Gary Chin
*Attorney, Agent, or Firm*—Michael W. York

[57] ABSTRACT

An auxiliary computer system for use on a vehicle that has a main computer. The computer system includes a cartridge computer that is removable from the vehicle and a receptacle in the vehicle for receiving the cartridge computer that is called a data transfer unit. The data transfer unit is electrically connected to the vehicle's normal or main computer. The computer system also includes a stationary station that is located outside of the vehicle. The cartridge computer is inserted into this stationary station for programming and testing of the cartridge computer and for reviewing information in the cartridge computer that was accumulated while the cartridge computer was in the vehicle. The method of using the auxiliary computer system is also set forth. The auxiliary computer system and method are particularly useful in connection with aircraft and spacecraft that have a main computer.

8 Claims, 5 Drawing Sheets

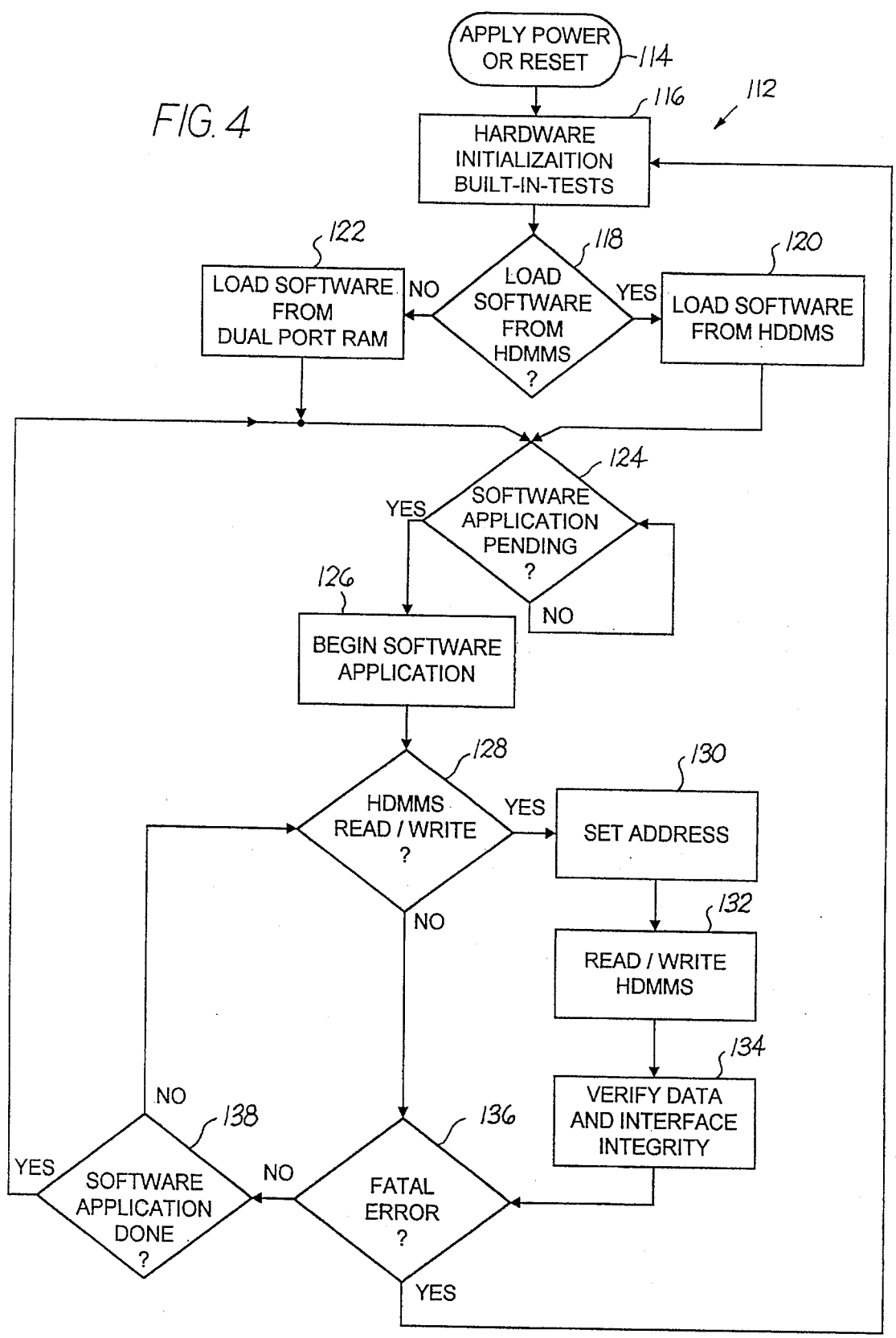

VEHICLE COMPUTER SYSTEM AND METHOD

BACKGROUND OF THE INVENTION

Computers are in wide use in a variety of vehicles. They are widely used in all types of aircraft and spacecraft for navigation and they are also in wide use for navigation in naval craft. Computers are also widely used in aircraft and spacecraft for the planning of a variety of missions. Computers are in use in military aircraft to assist in delivering various types of ammunition and ordnance to military objectives. In addition, computers assist the crew of military aircraft in managing the firing or releasing the stores of ordnance on the aircraft.

The many uses for computers on vehicles has created a very real problem in terms of space for additional computer capacity. Also, the addition of extra computer capacity usually means that the structure of the vehicle must be altered and that the existing computer may also have to be altered or re-configured.

Many vehicles are designed for a wide variety of uses or missions. Some of these missions may require a large amount of computer capacity and yet other missions may require very little computer capacity. In addition, some vehicle missions may be very specialized and require special data and specialized processing capabilities that are ordinarily not needed on the vehicle. The normal presence of such special data and processing capabilities on the vehicle is unnecessary and represents an added expense. An example of such a specialized need are various military aircraft training missions such as simulated air combat.

This vehicle computer system and method invention overcomes these problems associated with prior vehicle computers and their methods of use. With this invention it is possible to tailor the computational capability of a vehicle to suit a particular vehicle mission without altering the vehicle structure or adding to the permanent vehicle computer. This allows the vehicle to have an increased computational capability, but at a very low cost. The invention also allows the off-loading of a portion of the vehicle computer capability for modification, analysis and servicing purposes.

SUMMARY OF THE INVENTION

This invention relates to computers and more particularly to computers for vehicles.

It is an object of the invention to provide a vehicle computer system and method that provide a portable computer system for vehicles.

It is an object of the invention to provide a vehicle computer system and method that provide a portable computer system for vehicles particularly for aircraft and spacecraft.

It is an object of the invention to provide a vehicle computer system and method that provide a portable computer for vehicles where data base preparation is accomplished off the vehicle.

It is an object of the invention to provide a vehicle computer system and method that provide a portable computer system for aircraft or spacecraft where data base preparation is accomplished on the ground.

It is an object of the invention to provide a vehicle computer system and method that provide a portable computer system for aircraft or spacecraft that permits ground based mission debriefing.

It is an object of the invention to provide a vehicle computer system and method that provide a portable computer system for aircraft or spacecraft that require no changes to the aircraft or spacecraft structure.

It is an object of the invention to provide a vehicle computer system and method that provide low cost training.

It is an object of the invention to provide a vehicle computer system and method that provide low cost training related to the operation or use of the vehicle.

It is an object of the invention to provide a vehicle computer system and method that provide low cost training related to vehicle mission planning.

It is an object of the invention to provide a vehicle computer system and method that increase a vehicle's capabilities.

It is an object of the invention to provide a vehicle computer system and method that have a wide range of uses.

It is an object of the invention to provide a vehicle computer system and method that can be used with any type of vehicle.

It is an object of the invention to provide a vehicle computer system and method that are particularly useful for aircraft and spacecraft.

It is an object of the invention to provide a vehicle computer system and method that provide for increased vehicle computer system capabilities at a low cost.

It is an object of the invention to provide a vehicle computer system and method that provide easy adaptability to various algorithms.

It is an object of the invention to provide a vehicle computer system and method that are highly cost effective.

It is an object of the invention to provide a vehicle computer system and method that are highly cost effective by eliminating the need to upgrade the on-board computer system.

It is an object of the invention to provide a vehicle computer system and method that provide a removable vehicle computer system a processing capability.

It is an object of the invention to provide a vehicle computer system and method that permit the off-loading of computational tasks from vehicle computer systems.

It is an object of the invention to provide a vehicle computer system and method that permit the off-loading of computational tasks from flight computer systems.

It is an object of the invention to provide a vehicle computer system and method where data can be easily manually carried to the vehicle.

It is an object of the invention to provide a vehicle computer system and method where data can be easily carried to the vehicle by the vehicle operator or a vehicle crew member.

It is an object of the invention to provide a vehicle computer system and method that are easy to use.

It is an object of the invention to provide a vehicle computer system and method that require only a low amount of training.

It is an object of the invention to provide a vehicle computer system and method that are very reliable.

It is an object of the invention to provide a vehicle computer system and method that use standard components.

It is an object of the invention to provide a vehicle computer system and method that require very little maintenance.

These and other objects of the invention will be apparent from the vehicle computer and method invention that is an auxiliary computer system for use on a vehicle that has a main computer that includes a removable cartridge computer, a receptacle in the vehicle for receiving the cartridge computer and for electrically connecting the cartridge computer to the main computer and a stationary station with a receptacle for the cartridge computer for programming, testing and reviewing information stored in the cartridge computer, plus the method of using the auxiliary computer system.

BRIEF DESCRIPTION OF THE DRAWINGS

The invention will be hereinafter more fully described with reference to the accompanying drawings in which:

FIG. 4 is a basic flow diagram of the software used in the removable computer of the vehicle computer system;

DETAILED DESCRIPTION OF THE PREFERRED EMBODIMENT

Figure 1:
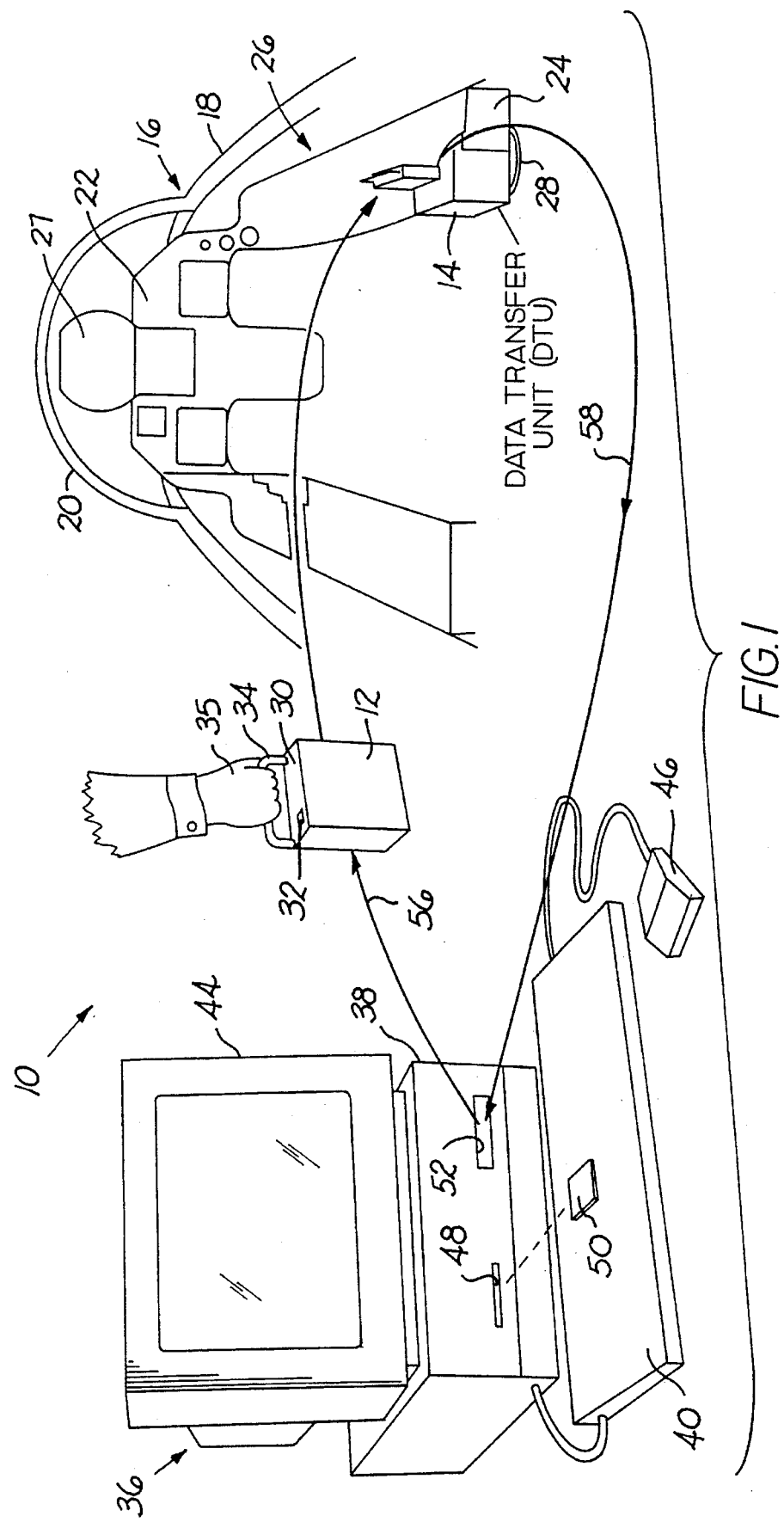
FIG. 1 is a perspective view of the vehicle computer system with a removable auxiliary computer partially installed in a vehicle such as an aircraft and illustrating by lines and arrows how the auxiliary computer is installed in a remote stationary station.

Referring first to FIG. 1, the auxiliary or supplemental removable computer system for a vehicle with a main or primary computer is illustrated and is designated generally by the number 10. The auxiliary computer system 10 comprises a removable cartridge type computer 12 that is sized and shaped to be inserted in a receptacle called a data transfer unit or DTU 14 that is located in a vehicle such as the aircraft 16 that is illustrated in FIG. 1. The aircraft has a fuselage 18, a canopy 20, a control panel 22 and a main or primary computer 24.

The cartridge computer 12 is located in the cockpit area 26 of the aircraft 16 for accessibility. The cockpit 26 also has a conventional head up display or HUD 27. It will be noted that the data transfer unit or DTU 14 is electrically connected to all avionics which reside on the MIL-STD-1553 bus via the electrical cable 28 and since the DTU 14 is electrically connected to the cartridge computer 12 when it is inserted into the DTU 14, the cartridge computer 12 can also be electrically connected to the avionics which include the main computer 24 with its memory 25. It will also be noted that the cartridge computer 12 has an erase switch 32 on the rear panel 30 and a handle 34 to allow a member of the aircraft crew to manually insert or remove the cartridge computer 12 from the DTU 14 as indicated by the aircraft crew member's hand 35.

The auxiliary or supplemental computer system for a vehicle 10 also comprises a remote exterior or stationary station located outside of the vehicle such as the aircraft 16 and this stationary station is illustrated in FIG. 1 and is designated generally by the number 36. The stationary station 36, which in this case is a ground station, comprises a computer 38, a keyboard 40 connected to the computer 38, a monitor 44 that is also connected to the computer 38, and a mouse 46 that is also connected to the computer 38 via the keyboard 40. The computer 38 has a conventional internal super disk drive 48 for conventional 3.5 inch high density disks such as the disk 50.

The computer 38 has a receptacle 52 that is sized and shaped to receive the cartridge computer 12 so that the cartridge computer 12 can be inserted into and electrically connected to the computer 38 so that the cartridge computer 38 can be tested, have programs loaded into it and have information in it reviewed in a manner that will hereinafter be described in detail. As indicated by the crew member's hand 35, the cartridge computer 12 is easily placed in the DTU 14 by an aircraft crew member using its handle 34 and yet it is easily withdrawn using the handle 34 and then inserted into the receptacle 52 in the computer 38. As indicated by the lines and arrows 56 and 58 this process can be reversed so that the cartridge computer 12 is first placed in the receptacle 52 in the computer 38, then in the DTU 14 and then returned to the receptacle 52.

The disk 50 can have an application program or programs on it and also data. By inserting it into the disk drive 48 and then selecting it through the use of the keyboard 40 or the mouse 46 and by also providing the appropriate commands through the use of the keyboard 40 or the mouse 46 the application program or programs can be loaded into the cartridge computer 12 when the cartridge computer 12 is located in the receptacle 52 in the computer 38.

Figure 2:
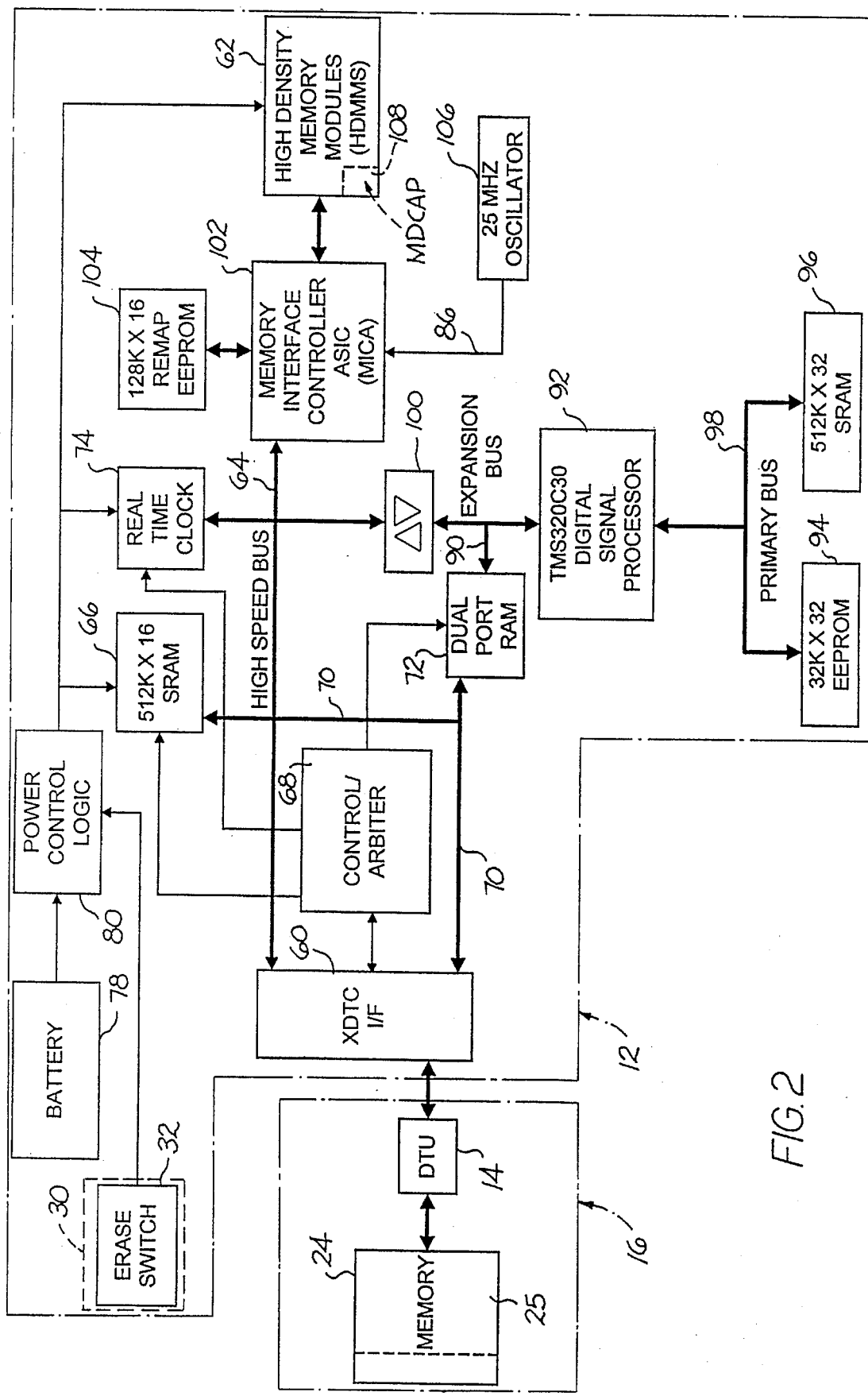
FIG. 2 is a block diagram of the electronic portions of the vehicle computer system illustrated in FIG. 1 without the remote station.

FIG. 2 is a block diagram of the electronic portions of the auxiliary computer system without the electronic portions of the remote station 36 that are conventional and well known in the art. As illustrated in FIG. 2, the electronic portions of the auxiliary computer system 10 can be grouped into fifteen functional blocks. Each of the fifteen blocks will now be discussed below.

The electronic portions of the auxiliary computer system 10 include, as part of the cartridge computer 12, an extended data transfer cartridge interface or XDTC interface 60. The extended data transfer cartridge (XDTC) interface 60 is a Fairchild standard interface that is available from Fairchild Space and Defense Corporation of Germantown, Md. This interface 60 utilizes 16 data bits and 13 address bits. This interface 60 allows a standard data transfer unit (DTU) to interface with the cartridge computer 12 at a 1 MByte per second rate without any wiring modifications. The interface 60 also provides a means of accessing the high density memory modules 62 via a high speed data bus 64 at a rate of up to 10 Mbytes per second. This high speed, 16 bit interface is designed for direct memory access (DMA) transfers.

The cartridge computer 12 also includes a static random access memory (SRAM) 66 that provides memory which may be accessed via the XDTC interface 60. This memory is used to store avionics initialization information as well as in-flight fault data. The SRAM 66 receives all control signals from a control/arbiter 68. These control signals include read, write, output enable, and chip select. Sixteen bit data to/from the SRAM 66 is distributed via a bus 70 which is common to both the SRAM 68, the XDTC, and a dual port RAM 72 that will hereinafter be described in detail. The cartridge computer 12 also has as part of its electronic portion a control/arbiter 68 that provides all of the signals required to control the XDTC interface 60, SRAM 66, the dual port RAM 72, and a real time clock 74. The control/arbiter 68 also generates interrupts to a digital signal processor 92 when a message is deposited into the dual port RAM via the XDTC interface 60. In addition, the control/arbiter 68 prevents simultaneous accesses of the same dual port RAM 72 location by the digital signal processor 92 and the XDTC interface 60 via its arbitration function. Priority is always given to the XDTC interface 60.

Some of the other electronic portions of the cartridge computer 12 include a battery 78 and a power control logic 80. When the cartridge computer 12 is removed from the DTU 14 or from a remote station 36, the power control logic 80 causes the SRAM 66, real time clock 74, and high density memory modules (HDMMs) 62 to derive their power from the battery 78. The battery 78 is a standard lithium type known in the art. The battery 78 allows the SRAM to be considered non-volatile. A FLASH memory could also be used and would avoid the need for a battery. An erase switch 32 that is on the rear panel 30 of the cartridge computer 12 causes the power control logic 80 to remove power from the SRAM 66 and the HDMMs 62 and thus erase the memories 66 and 62. The power control logic 80 also serves another function by reducing the output voltage level of the battery 78 so that battery life is increased. A precision oscillator 106 is used to provide a 25 MHz clock signal to the circuitry portions of the cartridge computer 12 via the lead or electronic path illustrated in FIG. 2 and that is designated by the number 86.

Another electronic portion of the cartridge computer 12 is the dual port RAM 72 that was previously mentioned. The dual port RAM 72 serves as a mail box for commands and data which are passed between a digital signal processor (DSP) 92 that will be hereinafter described in detail and the XDTC interface 60. The dual port RAM 72 effectively decouples the DSP 92 from the XDTC interface 60. The dual port RAM 72 is connected to both the XDTC interface bus 70 and an expansion bus 90 for the DSP 92. Simultaneous accesses of the same dual port RAM 72 location are prevented by the control/arbiter 68.

Other electronic portions of the cartridge computer 12 include a digital signal processor (DSP) 92, an electronically erasable programmable read only memory (EEPROM) 94 and a static random access memory (SRAM) 96. The DSP 92 is a Texas Instruments TMS320C30. This processor 92 allows embedded algorithms to be executed. These algorithms can be run concurrent with aircraft avionics initialization and data recording since the dual port RAM 72 decouples the DSP 92 from the SRAM 66 and the XDTC interface 60. The DSP's 92 primary bus 98 includes 32 data lines, 24 address lines, a read/write line, an external access strobe, a ready signal, a hold signal, and a hold acknowledge signal. Through the use of the expansion bus 90, the DSP 92 also has access to the dual port RAM 72 and, via a transceiver 100, to all devices residing on the high speed bus 64. The expansion bus 90 includes 32 data lines, 13 address lines, a read/write line, an external memory access strobe, an external I/O access strobe, and a ready signal.

Another electronic portion of the cartridge computer 12 is the real time clock 74. The real time clock 74 includes an oscillator and a standard CMOS LSI time-of-day counter with load, recall, and access capabilities. Resolution is to within 0.01 seconds with a count accumulation of years. The control/arbiter 68 provides the control required to load the real time clock 74 with data from the high speed bus 64 as well as the control necessary to enable the real time clock 74 data onto the high speed bus 64 during reads of the real time clock 74.

Additional electronic portions of the cartridge computer 12 are a memory interface controller ASIC 102 and a remap EEPROM 104. The memory interface controller ASIC (MICA) 102 is an ASIC (application specific integrated circuit) which includes control circuitry to interface with the high density memory modules (HDMMs) 62, the XDTC interface 60, and the TMS320C30 data signal processor (DSP) 92. The MICA 102 is capable of controlling direct memory access DMA transfers over the high speed bus 64 at rates of up to 10 Mbytes/second. The MICA 102 contains internal first in first out (FIFO) memory to decouple this data from the HDMMs 62. The MICA 102 performs error detection and correction (EDAC) using the Reed Solomon algorithm that is well known in the art. Errors of up to eight bytes out of 128 bytes can be corrected while errors in more than eight bytes can be remapped. The MICA 102 performs memory remapping functions by building a logical to physical address table in the remap EEPROM 104. Thus bad memory locations in the HDMMs 62 can effectively be removed from use. The MICA 102 runs at an internal clock frequency of 25 MHz. This clock signal is received from the 25 MHz oscillator 106 via the electrical path or conduit 86.

The cartridge computer 12 also includes another electronic portion, the high density memory modules (HDMMs) 62 that provide the mass memory for the cartridge computer 12. The cartridge computer 12 can contain up to eight HDMMs 62, each of which is a multichip module comprising SRAM or FLASH memory devices along with a custom interface gate array. The memory modules are accessed in pairs using command/control signals generated by the MICA 102.

Figure 3:
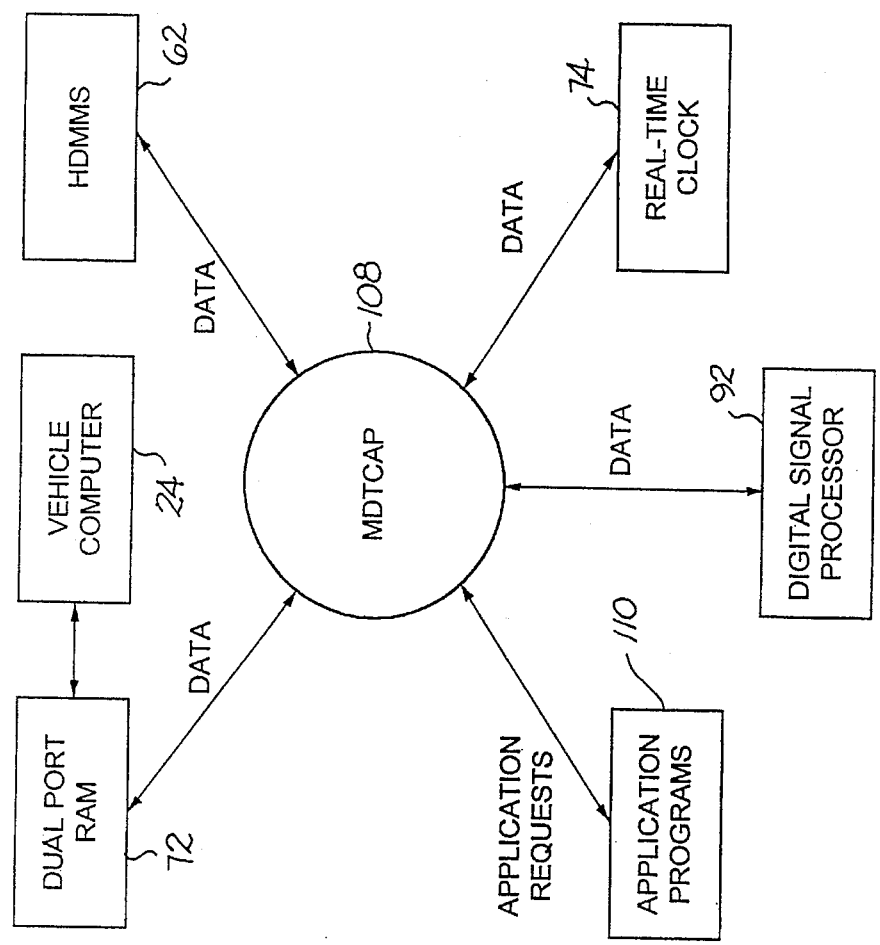
FIG. 3 is a block diagram view illustrating the context of the functioning of the important portions of the removable vehicle computer that forms part of the vehicle computer system invention.

An integral part of the cartridge computer 12 is a computer program called the mega data transfer cartridge application program (MDTCAP). The MDTCAP is a multitasking operating environment which allows user computer applications to run in the cartridge computer 12 without a knowledge of the cartridge computer's 12 hardware implementation. FIG. 3 is a context diagram which shows the interactions between the MDTCAP 108, user application programs represented by the block 110, and the cartridge computer 12 hardware items 72, 62, 74, 92. The MDTCAP 108 allows multiple applications represented by the block 110 to be executed by the DSP 92 within the cartridge computer 12. Each application in 110 is assigned a priority and is scheduled to run at predetermined times. Applications in 110 such as built-in-test (BIT) can be assigned a low priority and can be scheduled to run continuously when other programs are running simultaneously. As a result, these applications in 110 run as a continuous background task.

MDTCAP allows data to be transferred between the cartridge computer hardware and the application programs in 110 via subroutine calls. Aircraft vehicle data is available through a call to the Dual Port RAM 72 and HDMM 62, and timing related data is available through a call to the real-time clock 74. Due to the nature of the MDTCAP 108, the application programs represented by block 110 require no knowledge of the hardware configuration within the cartridge computer 12. The MDTCAP 108 is located within HDMMs 62. The MDTCAP is loaded into the DSP 92 when the cartridge computer 12 is inserted into the DTU 14 or the stationary station 36 and power is applied or when a reset occurs.

FIG. 4 illustrates a flow diagram of the basic MDTCAP software that is designated generally by the number 112. When the cartridge computer 12 is inserted into the data transfer unit (DTU) 14 or the ground equipment 36, power is applied as indicated in block 114 and the flow set forth in FIG. 4 begins. Block 114 also indicates that a reset is able to start the flow. First, the hardware is initialized with boot software stored in EEPROM 94. The boot software allows the step of built-in tests (BIT) to be performed 116. A decision 118 is then made as to whether the MDTCAP and user software applications are to be loaded from the dual port RAM 72 or from the HDMMs 62. The decision is made based on a message stored in the dual port RAM 72. Software is then loaded from either the dual port RAM 72 or the HDMMs 62 (flow diagram step blocks 120 and 122).

After the software is loaded, the MDTCAP determines whether or not a software application 110 is pending as indicated by decision 124. Applications are run at pre-specified time increments. If no software applications are pending, the cartridge computer hardware remains idle. When an application is available for execution, execution is started as indicated by the step 126 and the MDTCAP allows accesses to the HDMMs 62 to occur as indicated by the decision 128. If an HDMM access is required, the software sets up the address 130, performs a HDMMs read or a write step 132, and verifies the integrity of the data and the interface in step 134. The integrity of the data and the interface is assured via the Reed-Solomon error detection and correction circuitry which is contained within the MICA 102. If a fatal error is detected with decision 136, a reset is issued and the hardware is reinitialized and built-in-tests are re-run in step 116. The results of the built-in-tests are stored in the Dual Port RAM 72.

If no error is detected, and the software application is complete as determined by the decision 138, the hardware is returned to an idle state and the hardware and software wait for a new application to be available for execution 124. If the software application is not complete as determined by the decision 138, control loops back to the HDMM access routine starting with the decision 128.

During the above flow, an interrupt to the DSP 92 will cause the flow to be interrupted and an interrupt routine to begin. Interrupts are initiated by the DTU 14 when messages received via the MIL-STD-1533 bus 28 require attention by the DSP 92. The message needing attention is placed into the dual port RAM 72 via the XDTC interface 60. This routine is shown in FIG. 5.

Figure 5:
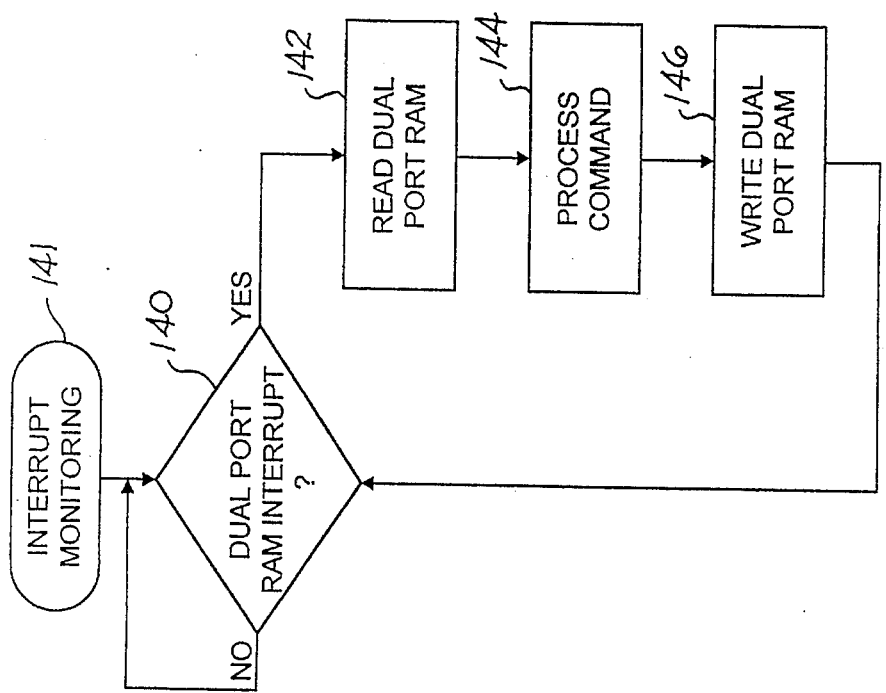
FIG. 5 is a flow diagram of a portion of the software used in the removable computer of the vehicle computer system invention.

As indicated in FIG. 5, interrupt monitoring 141 takes place continuously and a decision is made if there is a dual port interrupt 140. Then, the dual port RAM 72 is read in the step 142 and the command associated with the interrupt is processed in the step 144. After the completion of the interrupt processing, step block 146 indicates that data is written back to the dual port RAM 72. Control is then returned to the flow shown in FIG. 4 until the next interrupt is received.

Figure 6:
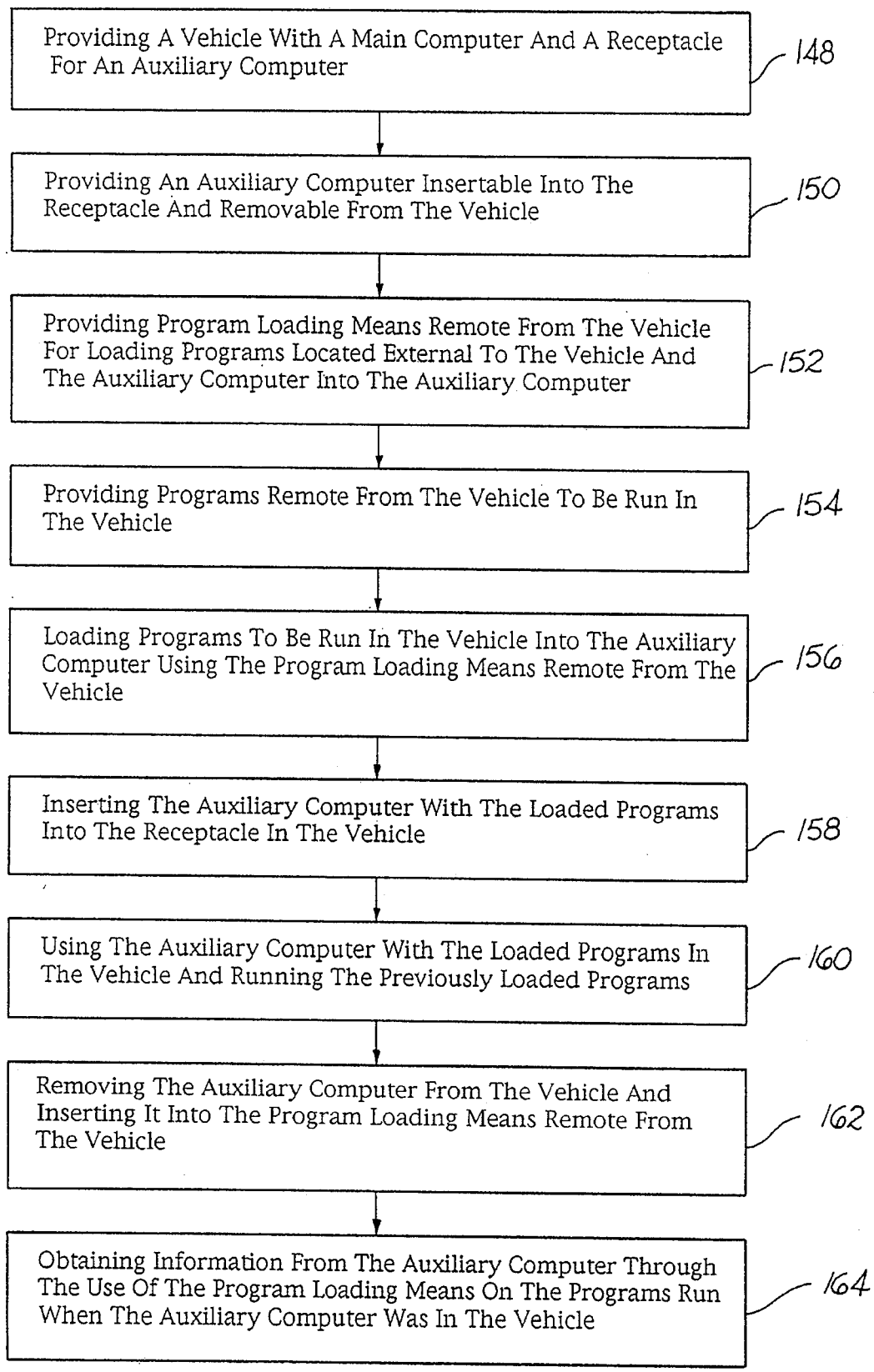
FIG. 6 is a block diagram view of the method of the auxiliary vehicle computer invention.

The auxiliary or supplemental computer system for a vehicle invention 10 is used and the method of the invention is practiced in the following manner. The basic vehicle auxiliary computer method is illustrated in FIG. 6 where the various blocks set forth the steps of the method. As illustrated in FIG. 6, the basic vehicle auxiliary computer method includes the steps of providing a vehicle with a main computer and a receptacle for an auxiliary computer 148, providing an auxiliary computer insertable into the receptacle in the vehicle removable from said vehicle 150 and providing program loading means remote from the vehicle for programs located external to the vehicle and the auxiliary computer into the auxiliary computer 152. The method also includes the steps of providing program loading means remote from the vehicle to be run in the vehicle 154 and loading the programs to be run in the vehicle into the auxiliary computer using the program loading means remote from the vehicle for loading programs into the auxiliary computer 156, inserting the auxiliary computer loaded with programs into the receptacle in said vehicle 158, using the auxiliary computer with the loaded programs in the vehicle 160, followed by the step of removing the auxiliary computer from the vehicle and inserting it into the program loading means remote from the vehicle for loading programs into the auxiliary computer 162. Then there is the step of obtaining information from the auxiliary computer through the use of the program loading means on the programs run when the auxiliary computer was in the vehicle 164.

In general there are three phases which occur during use of the supplemental removable computer system 10. They are mission or task data and application loading; vehicle in use or in-flight use; and mission or task debrief. Each of these three phases will be described below.

The first phase is the mission or task data and application loading phase. In this phase, prior to a mission or task, the cartridge computer 12 is inserted into the remote or exterior station which in this case is a ground station 36. While in the ground station 36, diagnostics may be run on the cartridge computer 12 to determine the technical status of the cartridge computer 12 and the battery 78. In addition, mission or task critical information such as the data required for avionics initialization, and application software and data may be loaded into the cartridge computer 12. After all necessary information has been loaded into the cartridge computer 12, the cartridge computer 12 is removed from the ground remote station which is a station 36 and the cartridge computer 12 is carried to the aircraft by a member of a crew of the aircraft. The MDTC/P's internal battery allows the data which was loaded at the ground station to remain intact for up to six months. Hence, mission or task data may be loaded well in advance of the actual use.

The second phase is the in-vehicle or in-flight use phase. In this phase when the cartridge computer 12 is brought to the plane or aircraft, it is inserted into the data transfer unit (DTU). As previously indicated, the DTU 14 is the aircraft 16 mounted receptacle which provides the electrical interfaces necessary for the cartridge computer 12 to communicate with the aircraft's 16 bus such as the 1553 bus and various discretes. When the cartridge computer 12 is inserted and engaged in the DTU 14, the cartridge computer 12 is locked into the DTU 14, the cartridge computer 12 switches to the DTU's power supply that is also the aircraft 16 power supply, internal built-in-test is run, the avionics which reside on the aircraft bus such as the 1553 are initialized, and the software applications which reside within the cartridge computer 12 begin execution. During the flight, the software applications in the cartridge computer 12 continue to execute. Data from the aircraft 16 avionics is fed to the cartridge computer via a bus in the vehicle such as the 1553 bus. The aircraft's 1553 bus is also used to output data from the cartridge computer 12 to the main computer of the aircraft 16. Processed information may then be displayed on the aircraft heads-up display (HUD) 27 or sent to aircraft 16 avionics residing on the 1553 bus. Of course, other displays such as a head down display could also be used. While in-flight, the cartridge computer 12 also allows mission related information to be recorded. Thus, faults which occur in the aircraft 16 avionics can be recorded and replayed at a later time.

The third and final phase is the mission or task debrief phase. In this phase, after the conclusion of the vehicle mission or task, the cartridge computer 12 is removed from the aircraft 16 and brought to the remote or ground station 36. The vehicle mission data which was stored during the flight mission may then be examined and used during the mission debrief or analysis phase.

Although the invention has been described in considerable detail with reference to a certain preferred embodiment, it will be understood that variations or modifications may be made within the spirit and scope of the invention as defined in the appended claims.

What is claimed is:

1. An auxiliary computer system for use with an aircraft vehicle having a main computer with avionics located in said aircraft vehicle comprising a removable auxiliary computer with an interface and having means for avionics initialization and data recording and for running programs including embedded algorithms therein adapted to be electrically coupled to said main computer, said removable auxiliary computer having a digital signal processor and a dual port random access memory coupled to said digital signal processor, a receptacle in said aircraft vehicle electrically connected to said main computer in said aircraft vehicle for receiving said removable auxiliary computer with said interface, said removable auxiliary computer with said interface being electrically connected to said main computer when said removable auxiliary computer is received by said receptacle in said aircraft vehicle for receiving said removable auxiliary computer, said dual port random access memory decoupling said digital signal processor from said interface allowing said embedded algorithms to be executed concurrently with said avionics initialization and said data recording, and a station located outside of said aircraft vehicle with a receptacle for receiving said removable auxiliary computer, said outside station having means for loading software programs into said removable auxiliary computer including programs to be run in said removable auxiliary computer when said removable auxiliary computer is located in said receptacle in said aircraft vehicle and having means for obtaining information from said removable auxiliary computer after said removable auxiliary computer is used in said receptacle in said aircraft vehicle and received by said receptacle of said outside station.

2. The auxiliary computer system of claim 1 wherein said removable auxiliary computer further comprises a mass memory.

3. The auxiliary computer system of claim 2 wherein said removable auxiliary computer further comprises a memory interface controller.

4. The auxiliary computer system of claim 3 wherein said removable auxiliary computer further comprises a real time clock coupled to said memory interface controller.

5. The auxiliary computer system of claim 4 wherein said removable auxiliary computer further comprises a battery.

6. The auxiliary computer system of claim 5 wherein said station located outside of said vehicle has means for testing the battery of said removable auxiliary computer.

7. The auxiliary computer system of claim 1 wherein said removable auxiliary computer has a handle.

8. The auxiliary computer system of claim 1 wherein said removable auxiliary computer has an erase switch.

\* \* \* \* \*